United States Patent
Hahn et al.

(10) Patent No.: US 7,823,965 B2
(45) Date of Patent: Nov. 2, 2010

(54) WIND DEFLECTOR IN THE FIELD OF MOTOR VEHICLES

(75) Inventors: Roland Hahn, Germering (DE); Dominik Hoelzel, Groebenzell (DE)

(73) Assignee: Webasto AG, Stockdorf (DE)

(*) Notice: Subject to any disclaimer, the term of this patent is extended or adjusted under 35 U.S.C. 154(b) by 166 days.

(21) Appl. No.: 12/162,785

(22) PCT Filed: Jan. 29, 2007

(86) PCT No.: PCT/DE2007/000179

§ 371 (c)(1),
(2), (4) Date: Jul. 30, 2008

(87) PCT Pub. No.: WO2007/090371

PCT Pub. Date: Aug. 16, 2007

(65) Prior Publication Data

US 2009/0001774 A1    Jan. 1, 2009

(30) Foreign Application Priority Data

Feb. 8, 2006    (DE) .................. 10 2006 005 815

(51) Int. Cl.
*B60J 7/22*    (2006.01)
(52) U.S. Cl. ...................................... 296/217
(58) Field of Classification Search .............. 296/217
See application file for complete search history.

(56) References Cited

U.S. PATENT DOCUMENTS

| 6,666,503 | B1 | 12/2003 | Sorensen |
| 6,793,277 | B2* | 9/2004 | Chon et al. ............... 296/215 |
| 6,834,914 | B2 | 12/2004 | Bohm et al. |
| 6,866,336 | B2* | 3/2005 | De Gaillard ............... 296/217 |
| 2007/0182217 | A1* | 8/2007 | Saleen et al. ............... 296/215 |

FOREIGN PATENT DOCUMENTS

| DE | 3922940 | * | 7/1990 |
| EP | 1342600 | | 9/2003 |
| FR | 2 845 038 | | 4/2004 |

OTHER PUBLICATIONS

International Search Report for PCT/DE2007/000179 dated Oct. 7, 2007.

* cited by examiner

*Primary Examiner*—Dennis H Pedder
(74) *Attorney, Agent, or Firm*—Marshall, Gerstein & Borun LLP

(57) ABSTRACT

A wind deflector for a partially releasable opening of a roof of a motor vehicle, which can be closed by means of a mobile roof part, said opening comprising a glass element forming an edge of the roof opening and/or part of the roof, a connection element which is fixed to an edge section of the glass element, facing the interior of the motor vehicle, a detachable element which can be detached from the glass element, and a clampable deflector element which is fixed to the detachable element with one of the edge sections thereof and to the connection element with the other edge section thereof.

5 Claims, 2 Drawing Sheets

WIND DEFLECTOR IN THE FIELD OF MOTOR VEHICLES

BACKGROUND OF THE INVENTION

1. Field of the Invention

The present invention relates to a wind deflector in the field of motor vehicles.

2. Related Technology

Although useable in any desired regions of a motor vehicle, the present invention and the problem on which it is based are explained in more detail with regard to a sliding roof of a motor vehicle. The present inventive concept can also be used, for example, on windows, sun roofs or panorama roofs of a vehicle.

A generally known problem with a motor vehicle sliding roof is that, when the cover is open, periodic fluctuations in pressure may occur in the interior of the vehicle when the vehicle is moving at low to medium speeds. Said periodic fluctuations in pressure are undesirably perceptible, mainly acoustically, in the form of "rumbling". Wind deflectors are generally used so as to avoid said fluctuations in pressure.

A wind deflector generally has the function of improving the flow conditions of the motor vehicle when, for example, the cover of a sliding roof is an open position. The wind deflector is usually arranged at the front end, as seen in the direction of travel, of the roof opening opened up by the sliding cover, and is transferred from a retracted position, in which is located below the outer surface of the vehicle roof, into a deployed position when the sliding cover is opened.

Conventional wind deflectors have a connecting element which is arranged in a curvature of a sheet-metal frame, which is assigned to the wind deflector, in the roof of the vehicle. The curvature is formed downward in the direction of the vehicle interior in the sheet-metal frame and, in addition to the connecting element, accommodates a wind deflector net when the sliding cover is closed.

In the embodiment described above, a first problem arises from the fact that the curvature in the roof frame reduces the vehicle interior in the region of the roof lining and therefore has an adverse effect on the comfort of the vehicle.

Furthermore, wind deflectors of this type have a deployment element arranged over the connecting element, with the wind deflector net being fastened in a manner such that it can be stretched out between the deployment element and the connecting element. In the deployed position of the deployment element, one section of the wind deflector net bears taughtly against a front roof edge of the roof opening. This has the purpose of preventing relative wind from flowing into the sheet-metal frame below the roof, and of therefore being able to reduce relative wind noises.

Furthermore, in the deployed position, the wind deflector has a deployment height which specifies the distance between an upper side of the roof and an upper edge of the deployment element. If said deployment height deviates by only a few tenths of a millimeter from a desired deployment height, the noise-reducing effect of the wind deflector deteriorates.

Added to this is the fact that vehicle roofs increasingly have glass elements or fixed glass elements which are arranged in front of and behind the sliding cover of the sliding roof. Said elements have the purpose of improving the feeling of space for vehicle occupants. Such glass elements are typically adhesively bonded in in the vehicle roof. When the glass elements are adhesively bonded in, deviations with regard to the precise position of the glass elements may occur, for example due to an uneven application of the adhesive (adhesive bonding tolerance).

Furthermore, such glass elements are slightly differently curved (glass curvature tolerance), this arising from the production process. If such glass elements form the front roof opening edge, then the latter is subject both to the glass curvature tolerance and the adhesive bonding tolerance of the glass element. In total, said tolerances may be in the region of several millimeters.

This gives rise to a second problem which consists in that the deployment height of the deployment element and therefore the reduction in noise is affected by the position of the roof edge. Furthermore, creases may form in the deflector net and therefore a disadvantageous production of noise may occur if the roof edge, in the region in which it bears against a deflector net, is arranged obliquely with respect to the deflector net. Consequently, the adhesive bonding tolerance and the glass curvature tolerance have a direct effect on the function of the wind deflector.

GENERAL DESCRIPTION OF THE INVENTION

Against this background, the invention provides a better wind deflector which, in particular is less sensitive to component and installation tolerances.

According to the invention, at least one of said objects is achieved by a wind deflector with the features of patent claim 1.

According to the invention, a wind deflector is provided for a roof opening of a roof of a vehicle, which roof opening can be closed and can be partially opened up by means of a movable roof part, with a glass element which forms a roof edge of the roof opening and/or part of the roof, with a connecting element which is fastened to an edge section of the glass element, said edge section facing the passenger compartment, with a deployment element which can be deployed with respect to the glass element, and with a stretchable deflector element which is fastened at its one edge section to the deployment element and at its other edge section to the connecting element.

In comparison to the known approaches of the prior art, the present invention therefore has the advantage that the deployment height of the deployment element is independent of the glass curvature tolerance and the adhesive bonding tolerance of the glass element. There is therefore no need for positioning processes which are highly precise and take up time and resources for the installation of the glass element. Furthermore, creases are not produced in the deflector element, since the glass element is always arranged flush with the deflector element. The constant deployment height and the elimination of creases ensure reduced relative wind noises in the region of the sliding roof. It is furthermore advantageous that the curvature of the sheet-metal frame can be of smaller dimensions since the connecting element for the deflector element is now no longer arranged below the deployment element but rather next to it. The vehicle interior is therefore enlarged and thus provides the occupants with more space in their head region.

Advantageous refinements and improvements of the wind deflector specified in patent claim 1 are found in the dependent claims.

According to a preferred development, the connecting element is designed as a foam encapsulation. Such a foam encapsulation can be attached to the glass element in an automated manner and can therefore result in cost savings and a shortening of the process time.

The foam encapsulation preferably contains polyurethane. Polyurethane is of a strength sufficient to permit permanent fastening of the deflector element Furthermore, certain polyurethanes have short curing times, which results in a shortened production process.

In a further preferred embodiment, the connecting element has a seal, in particular a hollow profile seal, against which a front edge of the movable roof part bears in a sealing manner when the roof opening is closed. As a result, in the closed position of the movable roof part, vibrations between the latter and the glass element are absorbed in the seal. Furthermore, the seal prevents water from penetrating between the edge of the glass element and the movable roof part when the roof opening is closed. Hollow seals can therefore be advantageous to use since they have a high degree of molding compatibility. In addition or alternatively, lip seals without a hollow profile may also be used.

In a further preferred development of the invention, the fastening of the deflector element to the connecting element and/or of the fastening of the deflector element to the deployment element is provided by means of weather strip elements, adhesive, encapsulation of the deflector element by injection molding, a weld seam and/or by wrapping it therearound. While connections with a cohesive material joint, such as adhesive, encapsulation of the deflector element by the connecting element by injection molding (i.e. for example, encapsulation of the glass element and of the deflector element with polyurethane by injection molding in a single step) and weld seams have the advantage of a low outlay on installation and a short processing time per component, form-fitting connections, for example by means of weather strip elements or by wrapping the deflector element around an axis of the connecting element, are easily releasable and therefore permit simple exchange of the deflector element should it be damaged.

A further advantageous refinement of the invention provides that the deflector element is designed as a film and/or as a net. This permits a simple and cost-effective reduction of wind noises.

BRIEF DESCRIPTION OF THE DRAWINGS

The invention is explained in more detail below with reference to the exemplary embodiments illustrated in the schematic Figures of the drawing, in which.

In all of the Figures of the drawing, elements which are identical or are functionally identical have each been provided with the same reference numbers—unless otherwise stated.

DETAILED DESCRIPTION

Figure 1:
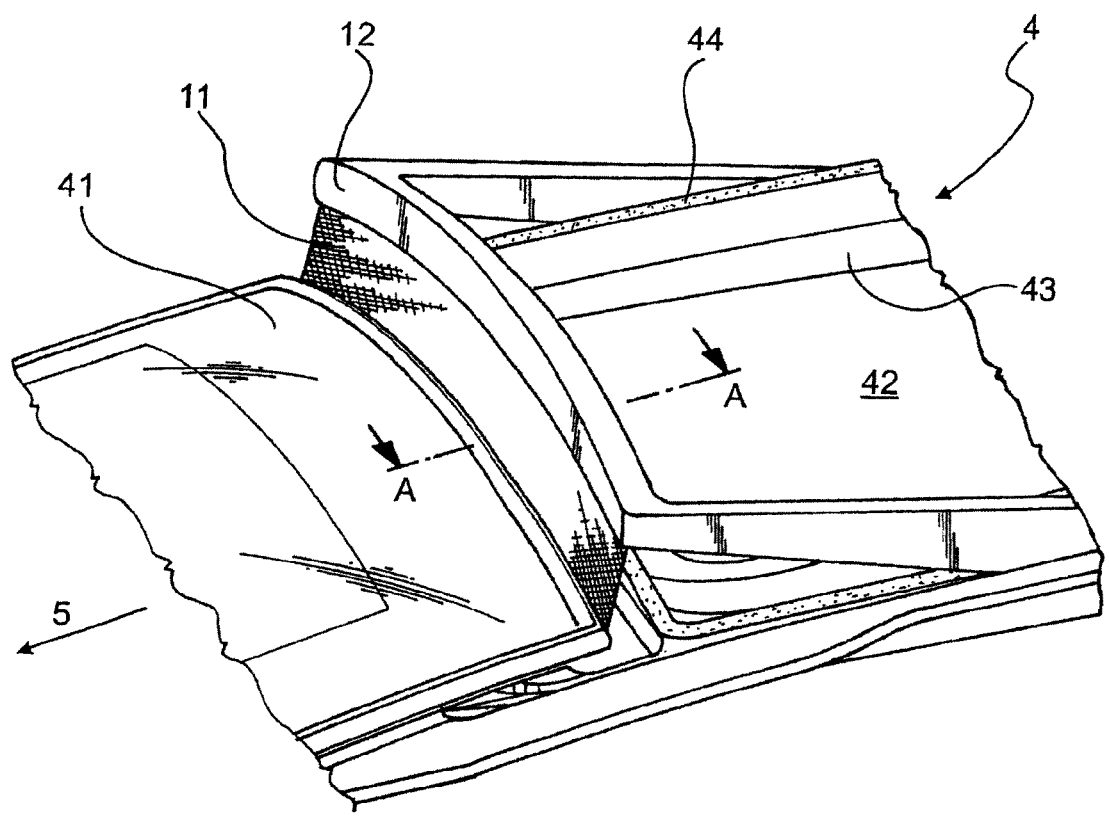
FIG. 1 shows, in a perspective view, an exemplary embodiment of a wind deflector according to the invention.

FIG. 1 shows a perspective view of an exemplary embodiment of a wind deflector 1 according to the invention. A roof 4 has a roof opening 42 with a sliding roof cover (not shown) displaced to the rear counter to the direction of travel 5. In its front region, the roof 4 has a glass element 41. A bow-shaped deployment element 12 is located in a position in which it is deployed with respect to the roof. A wind deflector net 11 is fastened to the deployment element 12 and to the glass element 41. The deployment element 12 is mounted pivotably in a sheet-metal frame 43, which is fitted in the roof 4 of the vehicle, and is prestressed in a deployment direction by means of a spring. In the deployed position of the deployment element 12, the deflector net 11 is stretched and reduces driving wind noises. A seal 44 is provided in a manner encircling the roof opening 42 in order to seal the roof when the sliding cover is closed.

Figure 2:
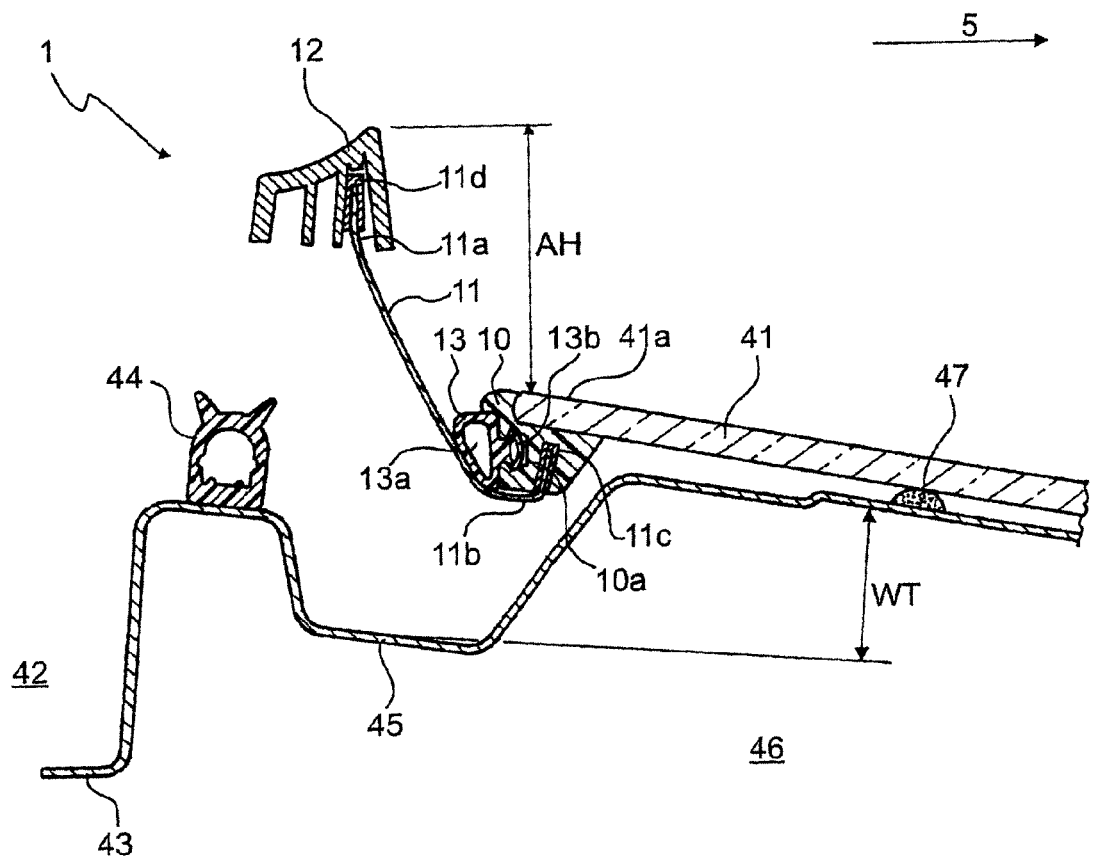
FIG. 2 shows a section A-A from FIG. 1.

FIG. 2 shows a section A-A from FIG. 1. A polyurethane foam encapsulation 10 is attached to the lower side of a front edge section 41a of the glass element 41. The polyurethane foam encapsulation 10 has a groove 10a in which an engagement element 13b of a hollow profile seal 13 with a chamber 13a on the longitudinal side is fitted. The hollow profile seal 13 is arranged here in such a manner that it is in contact mechanically and in an acoustically sealing manner with the sliding roof cover when the latter is closed. The deflector net 11 is fastened at its lower edge section 11b in the polyurethane foam encapsulation by means of weather strip elements. At its other edge section 11a, the deflector net 11 is fastened to the deployment element 12 by weather strip elements 11d.

When the deployment element 12 is in the folded-in position with the sliding cover closed, the curvature 45 of the sheet-metal frame 43 accommodates only the folded wind deflector net and part of the deployment element and does not accommodate the connecting element 10. In this embodiment, the curvature depth WT can be of very small dimensions, which results in the vehicle interior 46 being enlarged.

The glass element 41 is adhesively bonded to the sheet-metal frame 43 by means of adhesive 47. It can clearly be seen that the deployment height AH of the deployment element 12 is independent of a glass curvature tolerance and/or adhesive bonding tolerance in a direction perpendicular to the passenger compartment of the glass element 41. Furthermore, the polyurethane foam encapsulation 10 always bears flush against the deflector net 11 because it is directly connected to the deflector 11. Thus, when the deployment element 12 is deployed, creases do not arise in the deflector net 11.

Consequently, positioning processes during the installation of the glass element and production processes of the glass element can be designed with a lower degree of accuracy and therefore more cost-effectively. A reliable function of the wind deflector with regard to reducing wind noises remains ensured in this embodiment.

The invention is not restricted to the specific construction of the wind deflector that is illustrated in the above Figures.

| List of designations | |
|---|---|
| 1 | Wind deflector |
| 4 | Roof |
| 5 | Direction of travel |
| 10 | Connecting element |
| 10a | Groove |
| 11 | Deflector element |
| 11a, 11b | Edge sections |
| 11c, 11d | Weather strip elements |
| 12 | Deployment element |
| 13 | Seal |
| 13a | Chamber |
| 13b | Engagement element |
| 41 | Glass element |
| 41a | Front edge section |
| 42 | Roof opening |
| 44 | Encircling seal |
| 43 | Sheet-metal frame |
| 45 | Curvature |
| 46 | Passenger interior |
| 47 | Adhesive |
| AH | Deployment height |
| WT | Curvature depth |

The invention claimed is:

1. A wind deflector for a roof opening of a roof of a vehicle, which roof opening can be closed and can be partially opened up by a movable roof part, comprising a glass element that forms a roof edge of the roof opening and/or part of the roof, a connecting element fastened to a lower side of an edge section of the glass element, the lower side of the edge section facing the passenger compartment, the connecting element comprising a polyurethane foam encapsulation defining a groove and a seal having an engagement element disposed in the groove, thereby attaching the seal to the polyurethane foam encapsulation;

a deployment element that can be displaced with respect to the glass element between a retracted position and a deployed position, and a stretchable deflector element having an upper edge section that is disposed adjacent to an upper edge of the deflector element and a lower edge section that is disposed adjacent to a lower edge of the deflector element, the upper edge section of the deflector element being fastened to the deployment element, and a portion of the lower edge section of the deflector element being fastened in the polyurethane foam encapsulation of the connecting element at a location that is disposed in a common horizontal plane with the seal such that the lower edge section of the deflector element bears flush against the polyurethane foam encapsulation and the seal when the deployment element is in the deployed position.

2. The wind deflector as claimed in claim 1, wherein the a front edge of the movable roof part bears in a sealing manner against the seal when the roof opening is closed.

3. The wind deflector as claimed in claim 1, wherein the fastening of the deflector element to the connecting element and/or of the fastening of the deflector element to the deployment element is provided by at least one of weather strip elements, adhesive, encapsulation of the deflector element by injection molding, a weld seam, and wrapping.

4. The wind deflector as claimed in claim 1, wherein the deflector element is at least one of a film and a net.

5. The wind deflector of claim 2, wherein the seal is a hollow profile seal.

* * * * *